C. W. SCHMIDT.
AUTOGRAPHIC ATTACHMENT FOR CAMERAS.
APPLICATION FILED JUNE 22, 1918.

1,288,221. Patented Dec. 17, 1918.

Carl W Schmidt Inventor
By his attorneys Acker & Fetter

UNITED STATES PATENT OFFICE.

CARL W. SCHMIDT, OF PIEDMONT, CALIFORNIA, ASSIGNOR TO ANSCO COMPANY, OF BINGHAMTON, NEW YORK, A CORPORATION OF NEW YORK.

AUTOGRAPHIC ATTACHMENT FOR CAMERAS.

1,288,221.　　　　Specification of Letters Patent.　　Patented Dec. 17, 1918.

Application filed June 22, 1918. Serial No. 241,356.

*To all whom it may concern:*

Be it known that I, CARL W. SCHMIDT, a citizen of the United States, and a resident of Piedmont, county of Alameda, State of California, have invented a new and useful Improvement in Autographic Attachments for Cameras, of which the following is a specification, reference being had to the accompanying drawings.

It is the purpose of this invention to improve autographic attachments for cameras of the class in which a transparent or translucent member, tablet, strip or plate, capable of having an inscription suitably produced thereon, is introduced within the camera, either in front or in rear of the sensitive element, so that upon exposing the same to light, the inscription will be transferred or printed or photographed from the transparent or translucent member to the sensitive element, and that upon further treatment in a manner well understood the inscription will appear upon the resulting negative.

One form of such autographic attachment is described and illustrated in my application for Letters Patent of the United States filed October 3, 1914, Serial No. 864,795.

More particularly described, this present invention relates to the construction of the slideway, through which the transparent or translucent member is introduced, whereby the entrance of light sufficient to fog the sensitive element will be prevented.

I show herein a fractional part only of a camera or other photographic apparatus to which my invention is applicable, and I shall herein illustrate and describe one method only in which the attachment is applied thereto. My improved device is applicable to practically all forms of cameras—those in which the record is made upon the sensitive material from the back as well as from its front or sensitized face. I describe and illustrate only the specific form referred to since those familiar with such matters will at once know how to apply the same to photographic apparatus of other constructions.

Figure 1:
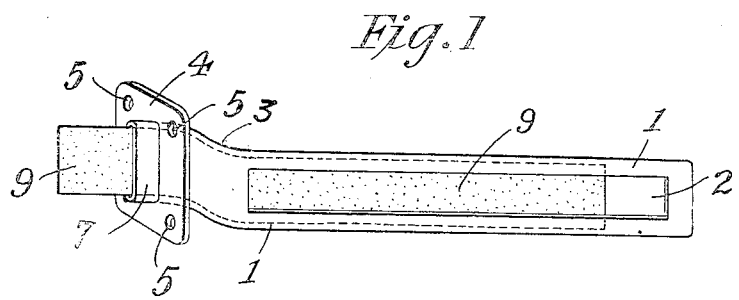
Figure 2:
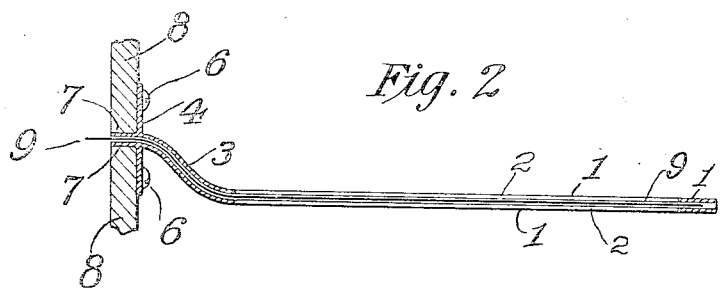
Figure 3:
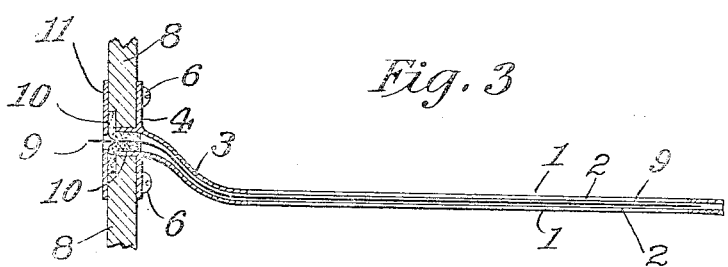

In the drawings, Figure 1 is a perspective view of one form of the device, showing the translucent or transparent inscription receiving member partially introduced therein; Fig. 2 is a longitudinal, central, sectional view of that which is shown in Fig. 1, the translucent or transparent inscription receiving member being fully introduced; Fig. 3 is a view similar to Fig. 2, showing a modified construction.

The device embodies a slideway 1, which is preferably made from a thin, flattened metal tube, through the inner part of which a longitudinally extending slot 2 is made, the walls of the outer part being solid and impervious to light. Near the outer end where the walls of the slideway are solid and light-proof, it is bent, as shown at 3, into the form of an ogee curve, that is to say, in two reverse curves, and also near the outer end of the slideway, and preferably distant therefrom the thickness of the side of the camera or other photographic apparatus to which the device may be attached, a plate 4 is preferably provided, with holes 5, 5, adapted to receive screws, rivets, or the like 6, whereby the device may be suitably held in position. The projecting end 7 of the slideway may extend through the side 8 of the camera, or like structure, so that its outer extremity will be flush with the side of the same. 9 represents the transparent or translucent member adapted to receive the inscription, or other matter, for the production of the record. In the present instance it is shown in the form of an elongated strip. It may, however, be in the form of a plate, or such other configuration as preferred; but whatever its shape, it should have sufficient rigidity and yet be sufficiently flexible to permit its introduction from the exterior through the slideway and by its flexure conform to the ogee curve thereof, and assume its proper position therein relative to the sensitive element, as shown in Figs. 1 and 2.

The operation of the device will be at once understood by those familiar with autographic devices as applied to photographic apparatus; that is to say: the desired matter to be recorded is written upon the inscription receiving member by any suitable means, as by a pencil, pen, or equivalent implement, in such position thereon that when the member is introduced through the slideway the matter so written will properly appear within the boundaries of the slot 2, see Fig. 1. The appropriate end of the member or strip is then introduced into the slideway at its outermost end 7 and pushed inwardly and during its movement the member by its impingement against the solid and light tight walls of the part of the slideway in which the ogee curve occurs, will be guided by the slideway and caused to itself assume such ogee contour. The inward passage of the strip or member is continued until it is suitably within the slideway, as shown in Fig. 2, and when in that position, the inscription or matter to be recorded will, as stated above, appear within the boundaries of the slot 2, adapted to be transferred to the sensitive element upon the admission of light. After the making of the record, the translucent or transparent member may be withdrawn and cleaned of the old inscription and repeatedly used in the manner explained.

I have demonstrated the fact that by constructing the slideway as explained and the practice of the foregoing procedure, no light, or at least not sufficient to injuriously affect the sensitive element will enter the slideway nor pass inward through the body of the transparent or translucent member itself and this for the reason, as I understand, that rays of light travel in right lines and unless reflected by a mirror or like surface, they rapidly lose their illuminating power upon being compelled to turn corners, so that if any actinic light should enter the very outermost end of the slideway where it passes through the wall of the camera, or through the body of the transparent or translucent member itself, it would straightway encounter the first curve of the ogee curve and be mostly dissipated or absorbed at that point, and such faint illumination as might pass through the remainder of the ogee curve would in turn encounter the second curve or bend therein and be so entirely absorbed or lost that no fogging of the sensitive element would result.

In Fig. 3 I show a modified construction which will sometimes be useful in the event that the inscription receiving member be removed from the slideway for any considerable time, or that it does not sufficiently fill the slideway. In this construction the parts are substantially the same as above described and are therefore correspondingly numbered, but in addition I provide adjacent to the outer end of the slideway where it passes through or adjoins the wall 8 of the photographic apparatus, two light excluding pads 10, 10, of felt, or equivalent means, between which the inscription receiving member is to be introduced, and which will yield to permit the passage of the same and yet snugly adjust themselves about its surfaces, thus preventing the entrance of light; and if the member be removed from the slideway, these light excluding devices will automatically close together and prevent the entrance of light. In order to give a suitable finished appearance to the exterior of the camera or like apparatus, I prefer to place a thin metal plate 11 against its side which shall cover and aid in holding in place the light excluding devices. The plate may be inset into the side of the camera, if preferred.

It will be obvious to those who are familiar with such matters that modifications may be made in the details of construction without departing from the essentials of the invention.

I claim:

1. An autographic attachment for cameras, comprising a slideway, one end of which is curved, adapted to be located within, connect with the exterior, and extend across the exposure field of a camera, and to receive a flexible inscription bearing member, and means to attach the device to a camera.

2. An autographic attachment for cameras, comprising a flat tubular slideway adapted to receive a flexible inscription bearing member and having reverse curves at its outer end and a slot through which the inscription may appear, and means to attach the device to a camera.

3. An autographic attachment for cameras comprising a slideway, one end of which is curved, adapted to be located within, connect with the exterior and extend across the exposure field of a camera and to receive a flexible inscription bearing member, and having a slot narrower than the inscription bearing member, the edges of the slot being adapted to guide and support said inscription bearing member, and means to attach the device to a camera.

4. An autographic attachment for cameras, comprising a tubular slideway adapted to receive an inscription bearing member, one end of the slideway being arranged in two separate planes with a light tight connection between them, the part of the slideway which is adapted to be placed adjacent to a sensitive member having a slot through which the inscription bearing member may appear, and means to attach the device to a camera.

5. An autographic attachment for cameras, comprising a tubular slideway, the outer end of which is impervious to light and arranged in two planes, adapted to receive an inscription bearing member and to be located in a camera so that said outer end shall connect with the exterior thereof, the part of the slideway which is adapted to be placed adjacent to a sensitive member having a slot, the edges of which are adapted to guide and support the inscription bearing member, and means to attach the device to a camera.

6. An autographic attachment for cameras, comprising a slideway arranged in two planes, adapted to receive an inscription bearing member and to be located within a camera so that its outer end shall connect with the exterior thereof, automatically acting light excluding devices at or near said outer end, and means to attach the device to a camera.

In testimony whereof I have signed my name to this specification.

CARL W. SCHMIDT.